Sept. 17, 1940.  L. S. HAMER  2,214,959
LINE BLIND
Filed June 8, 1938   2 Sheets-Sheet 1
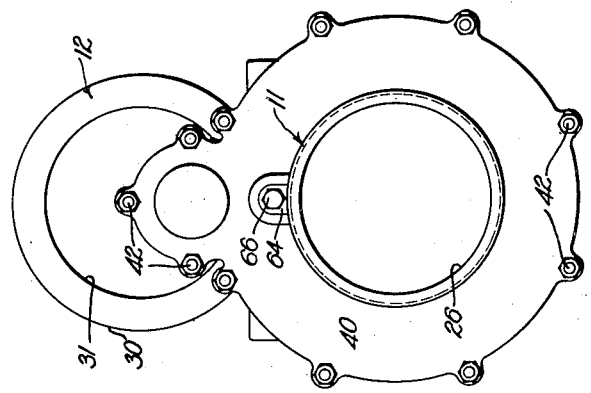
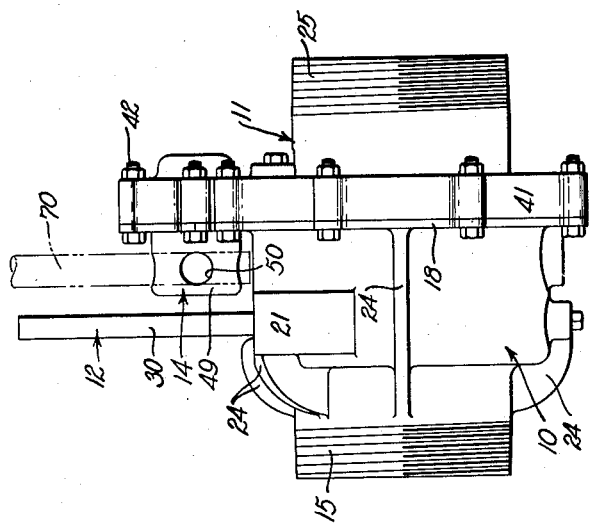
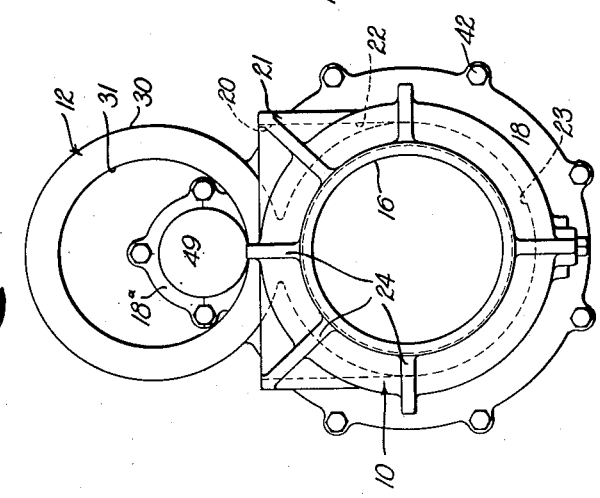
Inventor
LELAND S. HAMER
By
His Attorney

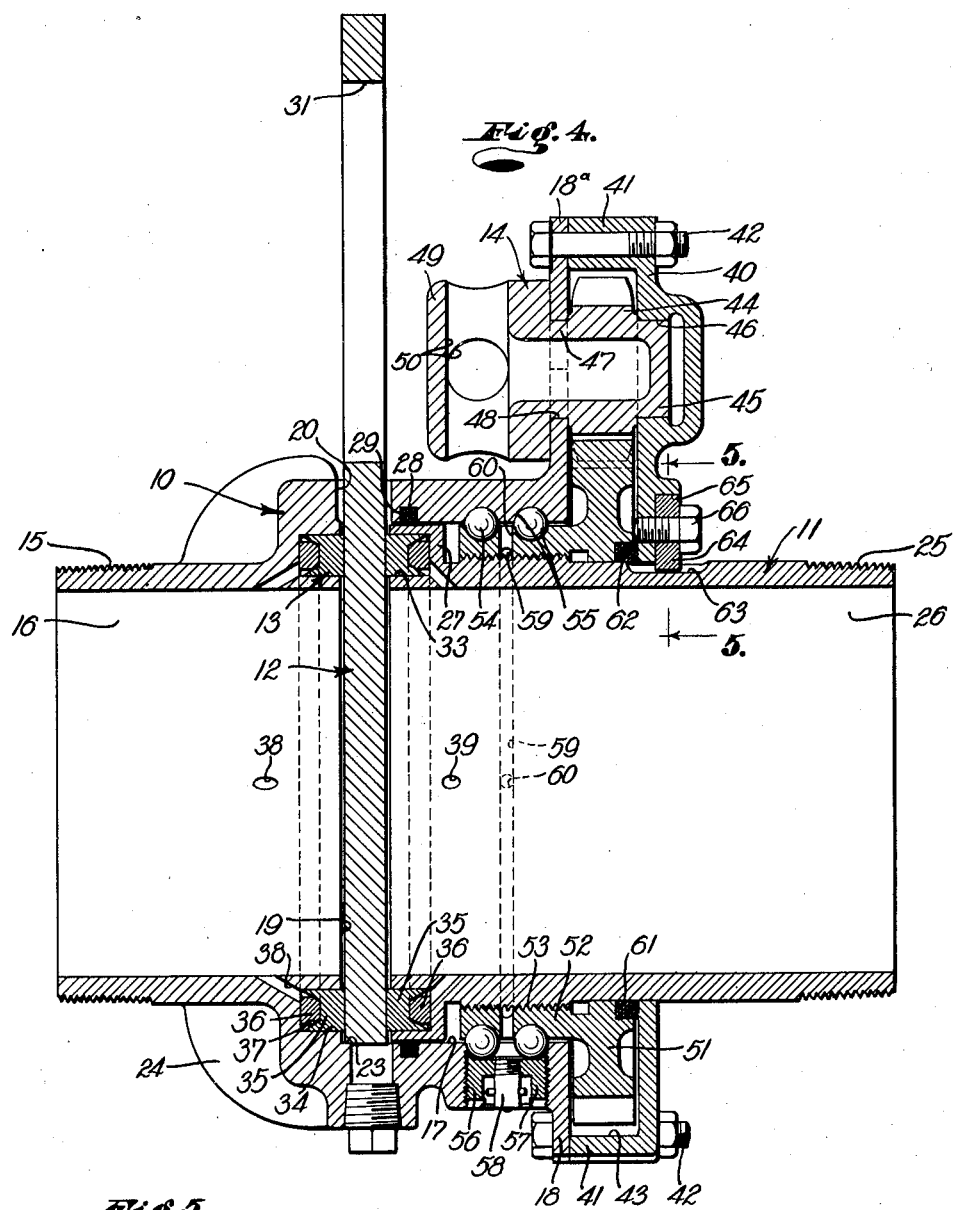
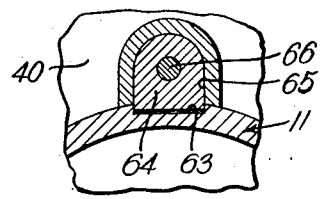

Patented Sept. 17, 1940

2,214,959

UNITED STATES PATENT OFFICE 2,214,959

LINE BLIND

Leland S. Hamer, Long Beach, Calif., assignor of one-fourth to Paul A. Dewhirst, Los Angeles, Calif.

Application June 8, 1938, Serial No. 212,491

9 Claims. (Cl. 251—167)

This invention relates to fluid handling devices and relates more particularly to line blinds for installation in pipe lines, conduits, etc. A general object of this invention is to provide a simple, conveniently operated line blind that provides a positive shut off.

Devices known as line blinds are used extensively in pipe lines, pumping installations, etc. where it is desired to cut off the flow to permit the replacement, repair, etc. of valves and other equipment. A conventional line blind consists of a pair of flanged fittings connected in the line and a "blind plate" adapted to be inserted between the flanges of the fitting to close off the line. Great difficulty and much labor is often involved in separating the flanges of a conventional line blind to receive the line blind plate. In many instances the fluid leaks or drains from the line during the extended operations required to install or remove a line blind plate and when the fluid is inflammable a dangerous fire hazard is created.

Another object of this invention is to provide a line blind in which the blind plate may be installed and removed quickly and with a minimum of labor.

Another object of this invention is to provide a line blind in which a single workman employing a simple lever or rod may perform all the operations required in the installation and removal of the blind plate.

Another object of this invention is to provide a line blind that embodies means for assuring a positive fluid tight seal at each side of the blind plate to maintain a leak tight shut off indefinitely and to prevent the leakage of fluid from the fitting or device when the line is open.

Another object of this invention is to provide a line blind of the character mentioned that embodies novel packing means operating under compression to effectively seal with the plate.

Another object of this invention is to provide a line blind of the character mentioned embodying a simple, inexpensive and easily operated means for maintaining the packing elements in tight sealing cooperation with the plate and for loosening or freeing the packing elements to permit removal or inversion of the plate.

A further object of this invention is to provide a line blind that is small and compact and easily installed.

The various objects and features of my invention will be fully understood from the following detailed description of a typical preferred form and application of the invention, throughout which description reference is made to the accompanying drawings, in which:

Fig. 1 is an elevation view of one end of the line blind of the present invention. Fig. 2 is a side elevation of the line blind. Fig. 3 is an elevation view of the other end of the line blind. Fig. 4 is an enlarged longitudinal detailed sectional view of the device and Fig. 5 is a fragmentary vertical detailed sectional view taken as indicated by line 5—5 on Fig. 4.

The improved line blind of the present invention may be said to include, generally, a body 10 and a shiftable tubular section 11 adapted to be connected in a pipe line, a plate 12, packing means 13 associated with the body 10 and section 11 for sealing with the plate 12, and means 14 for effecting relative movement between the body 10 and section 11 to actuate the packing means 13 against the plate 12 and to free the packing means from the plate.

The body 10 is in the nature of a tubular structure or housing and, in practice, may be an integral casting, as illustrated. The outer end of the body 10 is provided with means for connection with a pipe line while the inner end of the body is connected with the section 11. In the typical case illustrated the outer portion of the body 10 is provided with an external thread 15 to facilitate the connection of the device in the pipe line, it being understood that the body 10 may be flanged for attachment in the pipe line by a flange and bolt connection, or may be constructed for welding to a pipe line part. A fluid passage or opening 16 extends longitudinally through the body 10 from one end to the other. The opening 16 is preferably cylindrical, as illustrated. The inner end portion of the body 10 is enlarged in external diameter and a longitudinally extending socket 17 is provided in this enlarged portion of the body. The socket 17 is concentric with the opening 16 and receives the section 11 as will be subsequently described. A radial outwardly projecting flange 18 is provided on the inner end of the body 10 for the purpose to be hereinafter described.

In accordance with the invention the body 10 has a vertical or transverse slot 19 joining or intersecting the opening 16. The slot 19 is provided to receive the plate 12 and preferably has flat parallel side walls disposed in planes at right angles to the longitudinal axis of the opening 16. In the preferred construction the slot 19 intersects or joins the inner end or the bottom portion of the socket 17. A mouth 20 is provided at the upper or outer end of the slot 19 to pass or receive the plate 12. The mouth 20 is defined by suitable flanges 21 on the exterior of the body 10 and is somewhat wider than the slot 19 to readily receive the plate 12. The edge walls 22 of the slot 19 extend inwardly or downwardly from the mouth 20 in parallelism to the medial horizontal plane of the body 10 where they merge with a cylindrically curved wall 23 that is concentric with the longitudinal axis of the opening 16. The wall 23 constitutes the bottom wall of the slot 19 and has a diameter of curvature greater than that of the opening 16. In practice the bottom wall 23 of the slot 19 may be flush with the wall of the socket 17. If desired or believed necessary the body 10 may have external reinforcing flanges 24.

The section 11 is an elongate tubular element and has its inner end portion received in the socket 17 of the body 10. The outer end portion of the section 11 is provided with means for facilitating its connection in the pipe line. In the form of the invention illustrated an external thread 25 is provided on the outer portion of the section 11, it being understood that the section 11 may have other suitable means for connecting it with pipe line parts. The longitudinal opening 26 of the tubular section 11 is preferably of the same diameter as the body opening 16. The tubular section 11 is received in the socket 17 with considerable clearance and is supported in the socket by elements of the means 14, as will be subsequently described. An annular external flange or enlargement 27 is provided on the inner end of the section 11. The end face presented by the section 11 and its enlargement 27 is flat and parallel with the side walls of the body slot 19. The enlargement 27 is received in the socket 17 with clearance.

The invention provides means for sealing between the body 10 and the enlargement 27 of the section 11. An annular groove 28 is provided in the wall of the socket 17 in adjacent relation to the slot 19 and packing 29 is arranged in the groove 28 to seal with the periphery of the enlargement 27. The packing 29 is preferably in the nature of hydraulic packing and is pressed or forced in the groove 28. In the preferred construction the packing 29 is a laminated packing of fabric and rubber. When the pipe line and device handle gasoline or a similar liquid the rubber of the packing 29 absorbs the liquid and thus expands to maintain a fluid tight seal between the enlargement 27 and the body 10. The packing 29 being tightly confined in the groove 28 and by the enlargement 27 does not deteriorate through the above described absorption of the liquid.

The plate 12 is received in the slot 19 and when in the position illustrated throughout the drawings closes the device against the flow of fluid. The plate 12 is a simple, integral member having flat parallel side surfaces. The plate 12 is proportioned so that its side surfaces have suitable clearance with the side walls of the slot 19. The plate 12 may comprise two end portions of disc shape and of equal diameter. The disc-like end portions of the plate 12 are integrally joined at their peripheries. The end portions of the plate 12 have cylindrically curved peripheral surfaces 30. The surfaces 30 are of such diameter that they may accurately fit or cooperate with the wall 23 of the slot 19. One end portion of the plate 12 is imperforate and the other end portion of the plate has a fluid passing opening 31. In the construction illustrated the opening 31 in the plate 12 is of the same diameter as the openings 16 and 26. When the perforated or ported end portion of the plate 12 is received in the socket 19 its peripheral surface 30 is adapted to cooperate with the wall 23 to locate the plate in a position where the wall of the opening 31 is in concentric and flush relation with the walls of the openings 16 and 26. Accordingly, when the plate 12 is in what may be termed the open position with its opening 31 aligned with the openings 16 and 26 there is a free clear passage of uniform diameter throughout the length of the device for the free flow of fluid. If the device is employed as an orifice meter fitting the plate 12 may have an opening 31 of less diameter than the openings 16 and 26.

The packing means 13 is provided to seal with or pack against the plate 12. The means 13 includes or provides an annular groove 33 in the inner end of the enlargement 27 and a similar opposing groove 34 in the wall of the slot 19. The grooves 33 and 34 surround the fluid passage of the device and are of like size and shape. In the preferred construction the grooves 33 and 34 have cylindrical concentric side walls and flat bottom walls. A sealing or packing unit is arranged in each groove 33 and 34. Each packing unit includes a packing ring 35 and a compression ring 36. The packing rings 35 are formed of a packing material that is effective under high compression forces. It has been found practical to construct the rings 35 of an asbestos compound. The rings 35 are molded or pre-shaped to have annular grooves 37 in their inner ends. The side walls of the grooves 37 are preferably rearwardly divergent. The outer or active ends of the packing rings 35 are preferably flat to seal with the flat side surfaces of the plate 12. The packing rings 35 are proportioned to project from their respective grooves 33 and 34 so that their outer active faces may cooperate with the side surfaces of the plate 12. The compression rings 36 are arranged in the grooves 33 and 34 behind or at the inner ends of the packing rings 35. The compression rings 36 are received in the grooves 37 and are shaped to cooperate with the walls of the grooves. The compression rings 36 may be constructed of metal and are provided to concentrate the forces transmitted to the packing rings 35.

It is preferred to provide means whereby the fluid under pressure handled by the device may act on the packing rings 35 to actuate them or to assist in actuating them. Circumferentially spaced ports 38 may extend through the wall of the body 10 from its opening 16 to the inner portion of its groove 34. Similar ports 39 may be provided in the section 11 to extend from the opening 26 to the inner portion of the groove 33. The metal compression rings 36 may be notched, grooved, or roughened to permit the fluid admitted by the ports 38 and 39 to act on the opposing divergent walls of the grooves 37. The rings 36 do not fully occupy the grooves 37 and the fluid under pressure admitted by the ports 38 and 39 acts on the walls of the grooves to urge the packing rings 35 into sealing engagement with the plate 12 and to expand the packing rings into sealing engagement with the walls of the grooves 34.

The means 14 for effecting relative movement between the body 10 and the section 11 is a feature of the invention. The means 14 is in the nature of a manually operable gear means for threading or shifting the section 11 axially with respect to the body 10 to bring the packing rings 35 into and out of tight sealing cooperation with the side surfaces of the plate 12. In the construction illustrated the means 14 includes an end plate 40 surrounding the section 11 in spaced adjacent relation to the body flange 18. An annular rim 41 extends axially from the plate 40 to cooperate with a side surface of the flange 18. Bolts 42 are passed through openings in the flange 18 and the rim 41 to connect the plate 40 with the flange. The flange 18 and the plate 40 with its flange 41 define a gear case or chamber 43.

The means 14 further includes a pinion or gear 44 within the chamber 43. The gear 44 is spaced outwardly from the section 11 and is rotatable about an axis parallel with the longitudinal axis of the device. A boss 45 is provided on the inner end of the gear 44 and is rotatably supported in a socket 46 in the plate 40. A shaft 47 projects outwardly from the gear 44 and is rotatable in an opening 48 in the flange 18. The boss 45 and the shaft 47 serve to rotatably support the gear 44. A head 49 on the outer end of the shaft 47 is provided with spaced radial openings 50 to receive a lever, rod 70 or similar device for turning the gear 44. In the preferred construction illustrated the shaft 47 and the head 49 are integral with the gear 44. With this construction it is preferred to split or divide the body flange 18 to have a removable section 18ᵃ. The section 18ᵃ is adapted to be attached to the rim 41, following the insertion of the gear 44 in the chamber 43, and thus facilitates the assembly of the integral gear shaft and head unit 44—47—49 on the body 10. The section 18ᵃ is held in place by the adjacent bolts 42. It will be observed that the head 49 is readily accessible for turning the gear 44.

The means 14 further includes a ring gear 51 surrounding and rotatable on the section 11. The gear 51 is housed in the chamber 43 and meshes with the gear 44 to be driven or turned thereby. A sleeve or nut 52 projects inwardly from the gear 51 in surrounding relation to the section 11. In the preferred construction the nut 52 is integral with the gear 51. The exterior of the section 11 and the interior of the nut 52 have mating threads 53. A rotatable connection is provided between the nut 52 and the body 10 so that rotation of the nut with respect to the body 10 causes the threads 53 to shift the section 11 axially relative to the body 10. In the preferred construction this rotatable connection is an anti-friction ball bearing connection and comprises spaced annular series of balls 54 arranged in grooves or races 55 in the nut 52 and the wall of the socket 17. An opening 56 is provided in the wall of the body 10 to admit the balls 54 to the races 55 when the device is assembled. The opening 56 is closed by a threaded plug 57. It will be apparent how the balls 54 cooperating with the races 55 allow free rotation of the nut 52 with respect to the body 10 and serve to prevent relative axial movement between the nut and the body.

It is preferred to provide means for lubricating the rotatable connection between the nut 52 and the body 10. A grease gun fitting 58 is threaded in an opening in the plug 57 to admit lubricant to the socket 17 and the races 55. An annular groove 59 is provided in the interior of the nut 52 and spaced radial ports 60 extend through the nut to the groove 59. The ports 60 conduct lubricant from the socket 17 to the groove 59 for the purpose of lubricating the threads 53. Lubricant admitted through the grease gun fitting 58 serves to lubricate the balls 54 and the races 55 and lubricates the threads 53 so that the threads do not stick. The lubricant serves to protect the threads 53 against the action of the fluid handled by the device. The outer end of the socket 17 communicates with the gear chamber 43 so that lubricant admitted through the grease gun fitting 58 may find its way into the chamber 43 to lubricate the gears 44 and 51.

The invention preferably includes packing means for preventing the leakage of lubricant from the gear chamber 43 and the socket 17. The packing 29 described above seals between the body 10 and the enlargement 27 of the section 11 to prevent the escape or leakage of lubricant from the inner end of the socket 17. An annular groove 61 is formed in the interior of the gear 51 and packing 62 is provided in the groove 61 to seal with the periphery of the section 11. The groove 61 is preferably open at the outer side or end of the gear 51 so that the packing 62 may seal with the internal surface of the plate 40. It will be seen that the packing 62 serves to prevent the leakage or escape of lubricant from the chamber 43 around the section 11. The packing 62 is preferably a graphite packing to offer a minimum of resistance to rotation of the gear 51 relative to the section 11.

Means is provided to prevent rotation of the section 11 with respect to the body 10 during operation of the means 14. A key-way or groove 63 is provided in the periphery of the section 11 and a key 64 is secured to the plate 40 to cooperate with the groove 63. In practice the key 64 may be set in a recess 65 in the outer side of the plate 40 and may be secured to the plate by a screw 66. The key 64 is shiftably received in the groove 63 to permit axial shifting of the section 11 with respect to the body 10 and cooperates with the opposite side walls of the groove 63 to hold the section 11 against rotation.

In the use or operation of the line blind of the present invention the body 10 and the associated section 11 may be easily connected in a pipe line or conduit. Under normal conditions, that is, when there is a flow of fluid through the pipe line the plate 12 is positioned so that its opening 31 is aligned with the openings 16 and 26. The head 49 may be rotated to shift the section 11 with respect to the body 10 to assure a positive dependable sealing engagement of the packing rings 35 with the opposite sides of the plate 12. When the head 49 is rotated the gear 44 meshes with the gear 51 to rotate the nut 52 and the mating threads 53 produce axial shifting of the section 11 with respect to the body 10. The head 49 may be conveniently turned with a minimum of effort to force the opposing packing rings 35 into tight engagement with the opposite surfaces of the plate 12. The compression strains are transmitted from the body 10 and the section 11 to the packing rings 35 through the rings 36 and these forces augmented by the fluid pressure acting on the walls of the grooves 37 maintain the packing rings 35 in tight sealing engagement with the plate 12 and in tight cooperation with the walls of their respective grooves 33 and 34. Thus the means 13 operates to maintain positive dependable seals with the opposite sides of the plate 12 so that fluid cannot leak about the plate or through the slot 19. As described above the opening 31 may have its walls flush with the walls of the openings 16 and 26 and as the plate 12 substantially completely occupies the slot 19 there is a free, unrestricted flow of fluid through a passage of uniform diameter.

When it becomes desirable or necessary to close off the conduit or line the lever or rod 70 may be inserted in one of the openings 50, as illustrated in Fig. 2 of the drawings, and manipulated to turn the head 49 and the gear 44. The gear 44 meshing with the gear 51 rotates the nut 52. Upon rotation of the nut 52 in the "backing off" direction the threads 53 operate to shift or retract the section 11 with respect to the body 10. This shifting of the section 11 relieves the compressional strain on the packing rings 35 and frees the plate 12 for ready removal from the slot 19. In practice only a very slight axial movement of the section 11 with respect to the body 10 frees the plate 12 for easy removal.

The projecting part of the plate 12 may be engaged to lift the plate from the slot 19. The plate 12 is then inverted and re-entered in the slot 19 to occupy the position illustrated throughout the drawings. The head 49 is then turned in the "advancing" direction to produce inward shifting of the section 11 with respect to the body 10. This results in the plate 12 being gripped or clamped between the opposing packing rings 35. A sufficient turning force may be applied to the head 49 to bring the packing rings 35 into tight positive sealing cooperation with the opposite sides of the plate 12. The conduit or line is then fully closed off and there can be no leakage from the fitting or line blind. If desired or necessary the head 49 may be turned from time to time to maintain the rings 35 in tight sealing cooperation with the plate 12.

The line blind of the present invention is such that the blind plate 12 may be easily and quickly removed and re-inserted. A single workman or operator may easily turn the head 49 to release the plate 12 for removal and to assure a positive seal about the plate 12. The line blind is small and compact and is easily installed. The means 14 is fully lubricated and there are no parts that may become corroded or stuck to offer resistance to easy operation.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A device of the character described comprising a body, a section shiftable relative to the body, the body and section having aligned fluid passages, the body having a slot intersecting its opening at an end of the section, a plate removably arranged in the slot, packing elements on said end of the section and the opposing wall of the slot for sealing with the opposite sides of the plate, and means for producing relative movement between the body and section to compress the packing elements against the plate and to release the packing elements from the plate, said means comprising a nut threaded on the section, a rotatable connection between the nut and body holding the nut against axial movement with respect to the body, a gear on the nut, and a gear meshing with the first named gear to rotate the nut.

2. A device of the character described comprising a body having a fluid passage, a socket at one end of the passage, and a transverse slot intersecting the passage at the inner end of the socket, a tubular section shiftable in the socket, packing rings on the wall of the slot and the inner end of the section, a plate removably received in the slot, and means for producing relative movement between the body and section to move the packing rings into and out of sealing cooperation with the plate, said means comprising a rotatable nut on the section, cooperating threads on the section and nut, means rotatably connecting the body and nut against relative axial movement, and means for rotating the nut.

3. A device of the character described comprising a body having a fluid passage, a socket at one end of the passage, and a transverse slot intersecting the passage at the inner end of the socket, a tubular section shiftable in the socket, packing rings on the wall of the slot and the inner end of the section, a plate removably received in the slot, and means for producing relative movement between the body and section to move the packing rings into and out of sealing cooperation with the plate, said means comprising a rotatable nut on the section, cooperating threads on the section and nut, means rotatably connecting the body and nut against relative axial movement, a gear rotatably carried by the body, a gear on the nut meshing with the first named gear, and means associated with the first named gear for manually turning the same.

4. A device of the character described comprising a body having a fluid passage, a socket at one end of the passage and a transverse slot intersecting the passage at the inner end of the socket, a tubular section shiftable in the socket, packing rings on the wall of the slot and the inner end of the section, a plate removably received in the slot, a nut in the socket threaded on the section, ball bearing means connecting the nut and body against relative axial movement, and means for rotating the nut to cause relative axial movement between the body and section to bring the packing rings into and out of sealing cooperation with the plate.

5. A device of the character described comprising a body having a fluid passage, a socket at one end of the passage and a transverse slot intersecting the passage at the inner end of the socket, a tubular section shiftable in the socket, packing rings on the wall of the slot and the inner end of the section, a plate removably received in the slot, a nut in the socket threaded on the section, ball bearing means connecting the nut and body against relative axial movement, a ring gear on the nut surrounding the section, an operating gear rotatably supported by the body and meshing with the ring gear, and means associated with the operating gear for manually rotating the same to cause relative axial movement between the body and section to move the packing rings into and out of sealing cooperation with the plate.

6. A device of the character described comprising a body having a fluid passage, a socket at one end of the passage and a transverse slot intersecting the passage at the inner end of the socket, a tubular section shiftable in the socket, packing rings on the wall of the slot and the inner end of the section, a plate removably received in the slot, a nut in the socket threaded on the section, ball bearing means connecting the nut and body against relative axial movement, a ring gear on the nut surrounding the section, an operating gear rotatably supported by the body and meshing with the ring gear, parts on the body defining a chamber enclosing the said gears, and means associated with the operating gear for manually rotating the same to cause relative axial movement between the body and section to move the packing rings into and out of sealing cooperation with the plate.

7. A device of the character described comprising a body having a fluid passage, a socket at one end of the passage and a transverse slot intersecting the passage at the inner end of the socket, a tubular section shiftable in the socket, packing rings on the wall of the slot and the inner end of the section, a plate removably received in the slot, a nut in the socket threaded on the section, ball bearing means connecting the nut and body against relative axial movement, means preventing relative turning between the body and section, and means for rotating the nut to cause relative axial movement between the body and section to bring the packing rings into and out of sealing cooperation with the plate.

8. A device of the character described comprising a body having a fluid passage, a socket at one end of the passage and a transverse slot intersecting the passage at the inner end of the socket, a tubular section shiftable in the socket, packing rings on the wall of the slot and the inner end of the section, a plate removably received in the slot, a nut in the socket threaded on the section, ball bearing means connecting the nut and body against relative axial movement, a ring gear on the nut surrounding the section, an operating gear rotatably supported by the body and meshing with the ring gear, parts on the body defining a chamber containing said gears, means for supplying lubricant to the socket and said chamber, and means associated with the operating gear for manually rotating the same to cause relative axial movement between the body and section to move the packing rings into and out of sealing cooperation with the plate.

9. A device of the character described comprising a body, a section shiftable relative to the body, the body and section having aligned fluid passages, the body having a slot intersecting its opening at an end of the section, a plate removably arranged in the slot, packing means on the body and section for sealing with the opposite sides of the plate, each of said packing means including a packing ring having an outer face for sealing with a surface of the plate and having a groove in its inner side, a compression ring in the groove, and means for admitting fluid pressure from one of said passages to the groove, and means for effecting relative axial movement between the body and section to actuate the packing means against the plate and to free the packing means from the plate.

LELAND S. HAMER.